US011777803B2

(12) United States Patent
Wang et al.

(10) Patent No.: US 11,777,803 B2
(45) Date of Patent: Oct. 3, 2023

(54) DEVICE MANAGEMENT METHOD, APPARATUS, AND SYSTEM

(71) Applicant: Huawei Technologies Co., Ltd., Shenzhen (CN)

(72) Inventors: Jianbing Wang, Nanjing (CN); Yu Yang, Beijing (CN); Xiaopeng Qin, Beijing (CN); Qin Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/716,476

(22) Filed: Apr. 8, 2022

(65) Prior Publication Data
US 2022/0231914 A1 Jul. 21, 2022

Related U.S. Application Data

(63) Continuation of application No. PCT/CN2020/117481, filed on Sep. 24, 2020.

(30) Foreign Application Priority Data

Oct. 12, 2019 (CN) .......................... 201910969471.6
Oct. 31, 2019 (CN) .......................... 201911063307.5

(51) Int. Cl.
*H04L 41/0816* (2022.01)
*H04L 43/065* (2022.01)
*H04L 41/0869* (2022.01)
*H04L 41/0213* (2022.01)

(52) U.S. Cl.
CPC ...... *H04L 41/0869* (2013.01); *H04L 41/0213* (2013.01); *H04L 41/0816* (2013.01); *H04L 43/065* (2013.01)

(58) Field of Classification Search
None
See application file for complete search history.

(56) References Cited

U.S. PATENT DOCUMENTS 10,225,158 B1    3/2019  Lu et al.
11,258,825 B1*   2/2022  Yang ....................... H04L 63/20
2012/0011517 A1* 1/2012  Smith .................. G06F 11/3006
                                                   715/224

(Continued)

FOREIGN PATENT DOCUMENTS

CN    102075348 A    5/2011
CN    106792538 A    5/2017

(Continued)

OTHER PUBLICATIONS

RFC 8639, E. Voit et al, "Subscription to YANG Notifications," Sep. 2019, 77 pages.

(Continued)

*Primary Examiner* — Joshua Joo
(74) *Attorney, Agent, or Firm* — Conley Rose, P.C.

(57) ABSTRACT

A first server device obtains first device information of the first server device. The first device information may include an event or a device identifier. The first server device determines a first condition corresponding to the first device information of the first server device, and performs a first processing action corresponding to the first device information when determining that the first device information meets the first condition.

25 Claims, 4 Drawing Sheets

(56) References Cited

U.S. PATENT DOCUMENTS

| | | | | |
|---|---|---|---|---|
| 2013/0232264 | A1* | 9/2013 | Stabile | H04L 43/04 709/224 |
| 2014/0379909 | A1* | 12/2014 | Roney | G06F 11/0754 709/224 |
| 2015/0161658 | A1* | 6/2015 | Little | G06Q 30/0243 705/14.45 |
| 2016/0019108 | A1* | 1/2016 | Banerjee | G06F 11/0772 714/57 |
| 2016/0306871 | A1* | 10/2016 | Chauhan | G06F 16/2477 |
| 2018/0077044 | A1* | 3/2018 | Turgut | G06F 11/3006 |
| 2018/0191552 | A1 | 7/2018 | Kushnir | |
| 2019/0215381 | A1* | 7/2019 | Mukund | H04L 67/63 |
| 2020/0167472 | A1* | 5/2020 | Hertenstein | H04L 9/3236 |
| 2020/0174868 | A1* | 6/2020 | Kedlaya | H04L 41/0631 |
| 2021/0184959 | A1* | 6/2021 | Côté | G06F 11/0709 |
| 2021/0272567 | A1* | 9/2021 | Topcu | G06F 16/9032 |

FOREIGN PATENT DOCUMENTS

| | | |
|---|---|---|
| CN | 106936858 A | 7/2017 |
| CN | 107147694 A | 9/2017 |
| CN | 107749799 A | 3/2018 |
| CN | 107800608 A | 3/2018 |
| CN | 108572907 A | 9/2018 |
| CN | 110166290 A | 8/2019 |
| CN | 110232006 A | 9/2019 |

OTHER PUBLICATIONS

RFC 8641, A. Clemm et al, "Subscription to YANG Notifications for Datastore Updates," Sep. 2019, 58 pages.

M. Wang et al, "A YANG Data model for Policy based Event Management," draft-wwx-netmod-event-yang-02, Jun. 29, 2019, 31 pages.

\* cited by examiner

DEVICE MANAGEMENT METHOD, APPARATUS, AND SYSTEM

CROSS-REFERENCE TO RELATED APPLICATIONS

This is a continuation of International Patent Application No. PCT/CN2020/117481 filed on Sep. 24, 2020, which claims priorities to Chinese Patent Application No. 201910969471.6 filed on Oct. 12, 2019 and Chinese Patent Application No. 201911063307.5 filed on Oct. 31, 2019. The disclosures of the aforementioned applications are hereby incorporated by reference in their entireties.

TECHNICAL FIELD

This application relates to the communications field, and in particular, to a device management method and apparatus, and a system.

BACKGROUND

A network management device may interact with a managed device according to a Network Configuration Protocol (NETCONF) or a Representation State Transfer Network Configuration Protocol (RSTCONF), monitor a running status of the managed device, and collect and analyze data of the managed device. After analyzing the data, the network management device delivers corresponding configurations to the managed device for network optimization and device control. For example, the managed device may send its running data to the network management device, and the network management device analyzes the received running data, to determine whether the managed device runs abnormally. When determining that the managed device runs abnormally, the network management device may send, to the managed device, a control instruction for exception handling. The managed device receives and executes the control instruction, to handle the exception of the managed device.

However, in the foregoing scenario, a network management device in one network system accesses a plurality of managed devices, and the managed devices send their own running information to the network management device. In other words, the network management device needs to analyze running information of server devices, and determine corresponding processing actions for the managed devices. As a result, the network management device needs to receive, store, and analyze a large amount of data, and this accordingly causes huge data processing pressure and extra overheads to the network management device, resulting in low efficiency of the network management device.

SUMMARY

Embodiments of this application provide a device management method, to resolve a technical problem of low efficiency of a network management device in a conventional technology.

According to a first aspect of an embodiment of this application, a device management method is provided. A first server device can determine a first processing action based on first device information of the first server device. Specifically, the first server device may obtain the first device information of the first server device. During actual application, because a processing action corresponding to a server device may be related to an event or a device identifier of the server device, the first device information of the first server device may include the event or the device identifier. Then, the first server device may determine a first condition corresponding to the first device information of the first server device, and perform the first processing action corresponding to the first device information when determining that the first device information meets the first condition. The first server device includes a correspondence between the first device information and the first condition, and the correspondence between the first device information and the first processing action. It can be learned that, according to the solution in the embodiments of this application, the first server device can manage the first device information, and the first server device does not need to send the first device information of the first server device to a network management device. This reduces data processing pressure of the network management device, and accordingly improves efficiency of the network management device.

In an implementation, the first server device may store the correspondence between the first device information, the first condition, and the first processing action, and the correspondence may be sent by the network management device to the first server device. Specifically, the network management device may send the correspondence between the first device information, the first condition, and the first processing action to the first server device. After receiving the correspondence between the first device information, the first condition, and the first processing action, the first server device may generate a script according to the received correspondence, and implement self-management on the first device information by using the script.

In an implementation, the network management device may send a first indication message to the first server device. The first indication message is used to indicate the first server device to determine the first processing action based on the first device information of the first server device. In other words, the first indication message is a message for delivering a self-management authority to the first server device. The network management device may send the first indication message to the first server device by using a NETCONF. After receiving the first message indication, the first server device may generate the script according to the received correspondence, and implement self-management on the first device information by using the script.

In an implementation, during actual application, in one aspect, the first server device has a corresponding database, for example, an operation status database. The database stores various types of running data in a running process of the first server device. Certainly, the database also includes the first device information. Therefore, the first server device may obtain the first device information from the database. In another aspect, the network management device may send a subscription message, for example, a first subscription message, to the first server device by using the NETCONF. The first subscription message is used to indicate the first server device to report subscribed information to the network management device. Usually, the subscribed information may include the first device information. Therefore, the first server device may obtain the first device information from the subscribed information of the first server device. In other words, the first server device may obtain the first device information by intercepting the subscribed information.

In an implementation, the first device information may include the event. During actual application, the first server device does not need to perform the corresponding processing action once the event is monitored, but when a parameter of the event reaches a specific threshold, the first server device performs the corresponding processing action. Therefore, if the first device information includes the event, the first condition may include the parameter and the parameter threshold. When the parameter of the event is greater than or equal to the parameter threshold, it is determined that the event meets the first condition.

In an implementation, the first device information may include the device identifier. In this case, the first condition may also include at least one device identifier. The first server device determines that the first device information meets the first condition only when determining that the device identifier of the first server device is included in the device identifier carried in the first condition. When the first server device determines that the device identifier of the first server device is not included in the device identifier carried in the first condition, because the device identifier carried in the first condition is different from the device identifier of the first server device, it indicates that the first device information does not meet the first condition.

In an implementation, the first processing action is a response action or an operation that may be performed by the first server device when the first device information of the first server device meets the first condition. The first processing action may include: for example, adjusting the subscribed information, configuring a data target, or sending a notification message to the network management device.

In an implementation, during actual application, a running status of a server device may be complex. In this case, when a processing action corresponding to the server device is determined, the processing action may not be a simple operation described above, for example, adjusting the subscribed information, configuring the data target, or sending the notification message to the network management device, and may alternatively continue to determine another policy that meets the condition. In other words, the first processing action may alternatively be performing a second processing action. Specifically, the first processing action may be a policy indicating a correspondence between second device information, a second condition, and the second processing action. Correspondingly, during specific implementation of performing the first processing action, the first server device may first obtain the correspondence between the second device information, the second condition, and the second processing action, and further determine whether the second device information meets the second condition, to determine whether to perform the second processing action. When determining that the second device information meets the second condition, the first server device performs the second processing action.

In an implementation, during actual application, the network management device may subscribe to the event of the first server device, to determine the running status of the first server device, and in particular, determine whether the first server device runs abnormally. If the first server device reports all events to the network management device, the network management device receives, stores, and processes a large volume of data. Usually, when the parameter of the event is greater than or equal to a preset threshold, the event may better reflect whether the first server device runs abnormally. In view of this, the first server device may send the event to the network management device when the parameter of the event is greater than or equal to the preset threshold. In this way, the network management device is enabled to determine the running status of the first server device, and the volume of data received, stored, and processed by the network management device is reduced. In other words, management efficiency of the network management device is considered.

In an implementation, the correspondence (hereinafter referred to as a policy) between the first device information, the first condition, and the first processing action may be sent by the network management device to the first server device. However, one network system may include a large quantity of server devices. Therefore, if the network management device separately sends the policy to each server device, most resources of the network management device are occupied. In addition, events that may be included in a plurality of server devices are similar. Correspondingly, processing actions that the plurality of server devices may need to perform are also similar. For ease of description, a server device group including the plurality of server devices is referred to as a first device set. In other words, policies sent by the network management device to the server devices in the first device set may be the same. To reduce the resources occupied by the network management device to send the policy to the server device, the network management device may send the policy to a server device representative in the first device set. Then, the server device representative receives the policy from the network management device, and sends the policy to another server device in the first device set. In other words, the first server device may be the server device representative in the first device set. After receiving the policy from the network management device, the first server device may send the policy to a second server device in the first device set.

In an implementation, during actual application, events that may be included in a plurality of server devices of a same device type are similar. In view of this, device types corresponding to the server devices in the first device set are the same. In other words, a device type of the first server device is the same as a device type of the second server device. In addition, if a plurality of server devices are located in a same management domain, events included in the plurality of server devices may be similar. In view of this, the server devices in the first device set may belong to a same management domain. In other words, the first server device and the second server device belong to a same management domain.

In an implementation, a step of determining the server device representative in the first device set may further be included. Specifically, the network management device may determine the server device representative from the first device set, or the server device in the first device set may determine the server device representative from the first device set. Regardless of whether the network management device determines the server device representative in the first device set or the server device determines the server device representative in the first device set, the server devices included in the first device set need to be first determined. Specifically, the server devices such as the first server device and the second server device may send third device information of the server devices to the network management device. The third device information may include a device type, may include a management domain identifier, or may include both a device type and a management domain identifier. After receiving the third device information from the server devices, the network management device may store the third device information of the server devices in a corresponding database. Then, the network management device divides the server devices into one or more device sets based on the third device information of the server devices. To be specific, the network management device may determine, based on the third device information of the first server device and the third device information of the second server device, that the first server device and the second server device belong to the first device set.

In an implementation, after the network management device determines the server devices included in the first device set, the network management device may continue to determine the server device representative in the first device set. Specifically, the network management device may obtain fourth device information of the server devices. The fourth device information may include an active/standby status of the server device, the fourth device information may include data traffic passing through the server device, or the fourth device information may include an active/standby status of the server device and data traffic passing through the server device. Specifically, the network management device may send a third subscription message to the server devices. After receiving the third subscription message, the server devices send the fourth device information to the network management device. After receiving the fourth device information from the server devices such as the first server device and the second server device, the network management device determines the server device representative in the first device set based on the fourth device information of the server devices in the first device set.

In an implementation, after determining the server device representative, for example, the first server device, in the first device set, the network management device may send a device identifier of another server device, for example, the second server device, in the first device set to the first server device. After receiving the device identifier of the other server device, the first server device may send the policy to the other server device, for example, the second server device, based on the device identifier of the other server device determined by the network management device.

In an implementation, after the network management device determines the server devices included in the first device set, the server devices included in the first device set may determine the server device representative in the first device set. Specifically, the network management device may send a device identifier of another device in the first device set to the server devices in the first device set. In this way, each server device in the first device set obtains device identifiers of all server devices in the first device set by using the network management device. Then, each server device in the first device set may perform a same step of determining the server device representative, that is, sending an information obtaining request to the other server device based on the device identifier of the other server device in the first device set. The information obtaining request is used to indicate the other server device to feed back fourth device information of the other server device. Then, the fourth device information from the other server device is received. After obtaining fourth device information of other server devices in the first device set, the server devices in the first device set may determine the server device representative by comparing the fourth device information of the server devices in the first device set.

In an implementation, during actual application, when the first processing action is determined based on the first device information of the first server device, an important objective is that performance of the first server device is improved after the first server device performs the determined first processing action. The performance of the first server device is improved after the first server device performs the determined first processing action. The first processing action may be comprehensively determined with reference to a plurality of events of the first server device.

In an implementation, during actual application, a specific processing action to be taken may be determined only when the plurality of events occur at the same time. Therefore, a corresponding processing action may be determined with reference to a plurality of events obtained by the first server device at a moment. However, moments at which the first server device obtains the plurality of events cannot be completely consistent. When a difference between obtaining moments of two events is small, it may be considered that the moments at which the first server device obtains the two events are a same moment. In other words, when a difference between obtaining moments of any two of the plurality of events is less than or equal to a first time threshold, it may be considered that the moments at which the first server device obtains the plurality of events are a same moment. Therefore, when the first processing action is comprehensively determined with reference to the plurality of events of the first server device, the difference between the obtaining moments of the plurality of events may be less than or equal to the first time threshold.

In an implementation, during actual application, a specific processing action to be taken may be determined only when the plurality of events successively occur in a period of time. Therefore, a corresponding processing action may be determined with reference to events corresponding to the first server device in a period of time. Specifically, at least two events exist in the plurality of events of the first server device. A difference between occurrence moments of the two events is greater than a first time threshold and less than or equal to a second time threshold. In other words, when the first processing action is comprehensively determined with reference to the plurality of events of the first server device, the first server device obtains at least two obtaining moments in a plurality of obtaining moments corresponding to the plurality of events. A time difference between the at least two obtaining moments is less than the second time threshold. In other words, the at least two obtaining moments are located in a period of time.

According to a second aspect, an embodiment of this application provides a device management apparatus, including: an obtaining unit, configured to obtain first device information of a first server device, where the first device information includes an event or a device identifier; a determining unit, configured to determine a first condition corresponding to the first device information, where the determining unit is further configured to determine that the first device information meets the first condition; and an execution unit, configured to perform a first processing action corresponding to the first device information in response to that the first device information is determined to meet the first condition.

In an implementation, the apparatus further includes a receiving unit, configured to receive, from a network management device, a correspondence between the first device information, the first condition, and the first processing action.

In an implementation, the obtaining unit is specifically configured to: obtain the first device information from a database of the first server device, or obtain the first device information from subscribed information of the first server device.

In an implementation, when the first device information includes the event, the first condition includes a parameter and a parameter threshold, and the determining unit is specifically configured to determine that a parameter of the event is greater than or equal to the parameter threshold.

In an implementation, when the first device information includes the device identifier of the first server device, the first condition includes at least one device identifier, and the determining unit is specifically configured to determine that the at least one device identifier includes the device identifier of the first server device.

In an implementation, the first processing action includes: adjusting the subscribed information, configuring a target parameter, or sending a notification message to the network management device.

In an implementation, the first processing action includes: performing a second processing action, and the execution unit is specifically configured to: obtain a correspondence between second device information, a second condition, and the second processing action; determine the second condition corresponding to the second device information; determine that the second device information meets the second condition; and perform the second processing action in response to determining that the second device information meets the second condition.

In an implementation, when the first device information includes the event, the apparatus further includes: a sending unit, configured to send the event to the network management device when determining that the parameter of the event is greater than or equal to a preset threshold.

In an implementation, the sending unit is further configured to send third device information of the first server device to the network management device, the third device information includes a device type of the first server device or a management domain identifier corresponding to the first server device, the third device information of the first server device is used to indicate the network management device to determine a first device set, the first device set includes the first server device and one or more other server devices, and the first server device and the one or more other server devices have a same device type or a same management domain identifier.

In an implementation, the sending unit is further configured to send fourth device information of the first server device to the network management device, the fourth device information includes an active/standby status of the first server device or data traffic passing through the first server device, and the fourth device information of the first server device is used to indicate the network management device to determine a server device representative from the first device set.

In an implementation, the receiving unit is further configured to receive fourth device information of a second server device, the fourth device information of the second server device includes an active/standby status of the second server device or data traffic passing through the second server device. The determining unit is further configured to determine, based on the fourth device information of the second server device, that the first server device is a server device representative.

In an implementation, the sending unit is further configured to send the correspondence between the first device information, the first condition, and the first processing action to the second server device that belongs to a same device set as the first server device, and the first server device is the server device representative in the first device set.

In an implementation, a device type of the second server device is the same as the device type of the first server device; or a management domain identifier of the second server device is the same as the management domain identifier corresponding to the first server device.

In an implementation, the event of the first server device includes a plurality of events, and a difference between obtaining moments of any two of the plurality of events is less than or equal to a first time threshold.

In an implementation, the event of the first server device includes a plurality of events, at least two types of events exist in the plurality of events, and a difference between obtaining moments of the two types of events is greater than a first time threshold and less than or equal to a second time threshold.

According to a third aspect, an embodiment of this application provides a server device. The device includes a processor and a memory. The memory is configured to store instructions. The processor is configured to execute the instructions in the memory, to perform the method according to any one of the first aspect.

According to a fourth aspect, an embodiment of this application provides a device management system. The system includes a network management device and a first server device, and the network management device is configured to send a correspondence between first device information, a first condition, and a first processing action to the first server device. The first server device is used in the device management method according to any one of the first aspect.

In an implementation, the system further includes a second server device. The first server device is further configured to send the correspondence between the first device information, the first condition, and the first processing action to the second server device, the first server device and the second server device belong to a first device set, and the first server device is a server device representative in the first device set.

According to a fifth aspect, an embodiment of this application provides a computer-readable storage medium, including instructions. When the instructions are run on a computer, the computer is enabled to perform the method according to any one of the first aspect.

According to a sixth aspect, an embodiment of this application provides a computer program product including a program. When the computer program product runs on a computer, the computer is enabled to perform the method according to any one of the first aspect.

DESCRIPTION OF EMBODIMENTS

The embodiments of this application provide a device management method, to resolve a problem in a conventional technology that efficiency of determining a processing action corresponding to a server device is low.

For ease of understanding, possible application scenarios of the embodiments of this application are first described.

Figure 1:
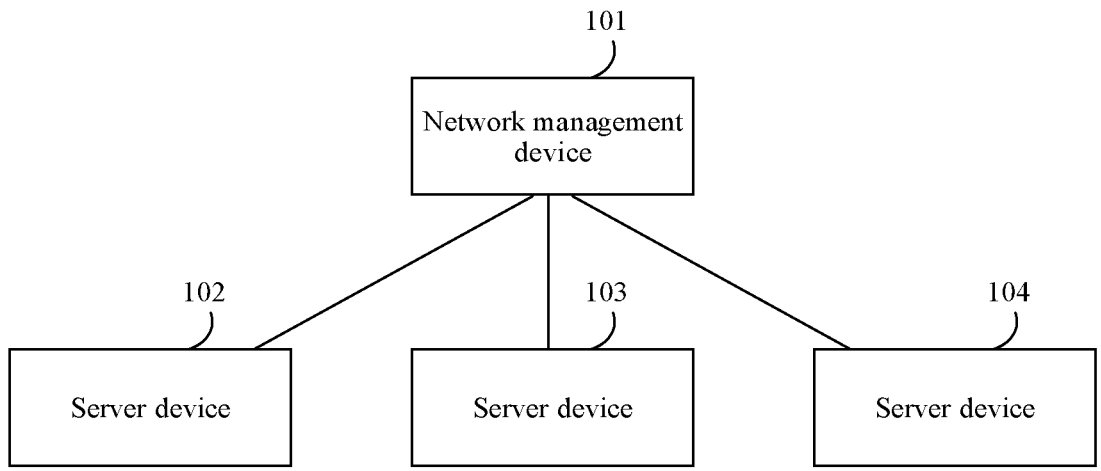
FIG. 1 is a schematic diagram of a structure of a network system according to an embodiment of this application.

FIG. 1 is a schematic diagram of a structure of a network system according to an embodiment of this application. The network system 100 shown in FIG. 1 may include, for example, a network management device 101, a server device 102, a server device 103, and a server device 104. It may be understood that FIG. 1 shows only for ease of understanding. During actual application, a quantity of server devices included in the network system 100 is not limited to the three shown in FIG. 1, and the quantity of server devices included in the network system 100 may be another quantity. Details are not enumerated herein one by one. It should be noted that the network management device mentioned in this embodiment of this application is a device on which a network management system is installed. The network management device 101 is not specifically limited in this embodiment of this application. The server device mentioned in this embodiment of this application may be a device on which an application program is installed. The server device may be a network device, for example, a router, a switch, or a terminal device. Details are not enumerated herein one by one.

Interaction between the network management device 101 and the server device 102 is used as an example below to describe a manner in which the network management device interacts with the server device.

The network management device 101 may interact with the server device 102 by using a NETCONF or a RESTCONF. The NETCONF is a standard protocol for installing, editing, and deleting network device configurations. The NETCONF provides a mechanism for managing the server device. The network management device can use this mechanism to add, modify, and delete configuration information of the server device, and obtain the configuration information and status information of the server device. Specifically, the server device may provide a corresponding application programming interface (API) by using the NETCONF, and the server device may directly interact with the server device through the API.

When the network management device 101 interacts with the server device 102, for example, when the network management device 101 subscribes to the status information of the server device 102, the network management device may deliver a corresponding Yet Another Next Generation (YANG) model to the server device 102. YANG performs data modeling by using a module or a submodule. The YANG model defines data that needs to be transferred when the network management device 101 interacts with the server device 102, for example, defines a reporting period, a type of status data, and the like. Configuration of the YANG model may be implemented by using the RESTCONF, and the RESTCONF is a Hypertext Transfer Protocol (HTTP). YANG-Push (Push) provides a subscription and push mechanism. The mechanism is used for database update, and may be used by the network management device to determine data objects need to be filtered and promptly updated. For example, the data may be filtered by using a selection filter. In this way, the network management device is allowed to continuously view running data of the server device, start and optimize system behavior of an entire network, and provide some performance assurance services for the network. The YANG is a data modeling language. For a specific definition, refer to the Request for Comments (RFC) 6020 and the RFC 7950.

It may be understood that the network management device 101 may collect device information of the server device 102, the server device 103, and the server device 104, analyze the collected device information, and further deliver corresponding configurations to the server device 102, the server device 103, and the server device 104 by using the YANG model. Although the network system 100 shown in FIG. 1 includes the three server devices, during actual application, the quantity of server devices included in the network system 100 may be far greater than 3. When there is a large quantity of server devices in the network system 100, the network management device 101 also collects a large amount of device information. Correspondingly, the network management device 101 stores and analyzes a very large volume of data. Correspondingly, huge data processing pressure and extra overheads are brought to the network management device 101, and a technical problem of low efficiency of the network management device is caused. For example, when the network management device controls the network by using an event-based policy, the network management device usually continuously updates a database by subscribing to data, and detects, based on a received event notification, whether an event meets a condition, to respond. However, the network management device can be very slow to respond to a plurality of events.

In a plurality of cases, the network can delegate responding behavior (for example, recovering from a network failure, and indicating the network to control congestion) of an event to the server device, so that the server device can respond to a network change as quickly as the event is detected.

In view of this, an embodiment of this application provides a device management method, to improve efficiency of a network management device. The network management device delivers an event-condition-action (ECA) policy to a server device, to deliver a policy control authority. The server device receives the ECA policy, and generates a script according to the policy, to quickly respond to an event included in the ECA policy. For definition of the ECA policy and a parameter included in the ECA policy, refer to related content in the RFC 8328.

With reference to the accompanying drawings, the following describes the device management method according to the embodiment of this application.

Figure 2:
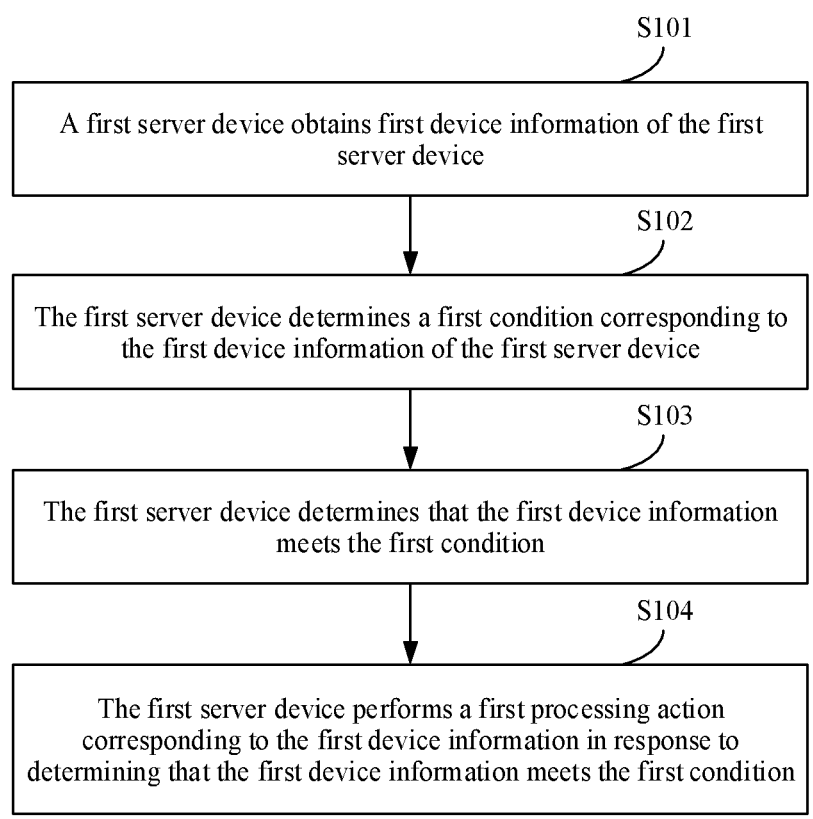
FIG. 2 is a schematic flowchart of a device management method according to an embodiment of this application.

FIG. 2 is a schematic flowchart of a device management method according to an embodiment of this application.

The embodiment of this application provides the device management method. For example, the method may be implemented through S101 to S104. It should be noted that a first server device may perform S101 to S104 based on a preset time period. A specific value of the preset period is not specifically limited in this embodiment of this application. It may be understood that when the preset period is small enough, an effect of continuously monitoring the first server device and a prompt response can be achieved. Alternatively, the first server device may perform S101 to S104 after receiving a corresponding instruction. This is not specifically limited in this embodiment of this application.

S101: The first server device obtains first device information of the first server device.

In this embodiment of this application, during actual application, in one aspect, a processing action corresponding to the server device may be determined based on an event of the server device. For example, whether the server device runs abnormally is determined based on the event of the server device, to determine the processing action corresponding to the server device. In another aspect, the processing action corresponding to the server device may further be determined based on a device identifier of the server device. For example, a server device related to a specific service has a specific processing action. Therefore, whether the server device is related to the specific service may be determined based on a device identifier of the server device, to further determine the processing action corresponding to the server device. In still another aspect, it is considered that a response made by the server device to the event may be related to a service performed by the server device. Therefore, when the processing action corresponding to the server device is determined, the event of the server device and the device identifier of the server device are further comprehensively considered. Therefore, in this embodiment of this application, the first device information of the first server device may include the event of the first server device, or may include the device identifier of the first server device.

In this embodiment of this application, the event refers to a status in which data changes or a data operation status changes, and is used to track a change of a status associated with one or more operation status data objects. The event may include an event, for example, an alarm, a network status change, a network security threat, a hardware fault, a buffer usage rate exceeding a threshold, network connection setting, or external device interaction, that causes the first server device to change.

In this embodiment of this application, the device identifier of the first server device is used to uniquely identify the first server device. For example, the device identifier may be an Internet Protocol (IP) address or a media access control (MAC) address of the first server device, and may alternatively be another identifier that may be used to identify the first server device. A specific form of the identifier is not limited in this application.

It should be noted that, during actual application, in one aspect, the first server device has a corresponding database, for example, an operation status database. The database stores various types of running data in a running process of the first server device. Certainly, the database also includes the first device information. Therefore, in an implementation of this embodiment of this application, the first server device may obtain the first device information from the database. In another aspect, a network management device may send a subscription message, for example, a first subscription message, to the first server device by using a NETCONF. The first subscription message is used to indicate the first server device to report corresponding subscription data information to the network management device. In this embodiment of this application, the information reported by the first server device to the network management device based on the first subscription message is referred to as subscribed information. Usually, during actual application, the subscribed information may include the first device information. Therefore, in still another implementation of this embodiment of this application, the first server device may obtain the first device information from the subscribed information of the first server device. In other words, the first server device may obtain the first device information by intercepting the subscribed information.

S102: The first server device determines a first condition corresponding to the first device information of the first server device.

In this embodiment of this application, the first server device stores a correspondence between the first device information and the first condition. After obtaining the first device information, the first server device may determine the first condition according to the correspondence between the first device information and the first condition.

S103: The first server device determines that the first device information meets the first condition.

S104: The first server device performs a first processing action corresponding to the first device information in response to determining that the first device information meets the first condition.

The first condition is a condition that needs to be met by the first server device to perform the corresponding processing action based on the first device information. After determining that the first device information meets the first condition, the first server device may determine and perform the first processing action according to the correspondence between the first device information and the first processing action.

It can be learned from the foregoing description that the first server device can manage the first device information, and the first server device can determine and perform the first processing action without sending the first device information of the first server device to the network management device. This reduces data processing pressure of the network management device, and correspondingly improves efficiency of the network management device.

In addition, after obtaining the first device information, the first server device may immediately determine and perform the first processing action according to the correspondence between the first device information and the first condition, and the correspondence between the first device information and the first processing action that are stored in the first server device, to promptly adjust a running status of the first server device. This also helps improve performance of the first server device.

The first condition is not specifically limited in this embodiment of this application. The first device information may include the event. During actual application, the first server device does not need to perform the corresponding processing action once the event is monitored, but when a parameter of the event reaches a specific threshold, the first server device performs the corresponding processing action. For example, if the event is the alarm, the parameter of the event may be a quantity of alarm times. When the quantity of alarm times is small, for example, within a fault tolerance range, the first server device may not respond. The first server device responds only when the quantity of alarm times is greater than a preset threshold. Therefore, in an implementation of this embodiment of this application, if the first device information includes the event, the first condition may include the parameter and the parameter threshold. When the parameter of the event is greater than or equal to the parameter threshold, it is determined that the event meets the first condition. It should be noted that, the parameter of the event mentioned herein may be, for example, a value of a monitored object corresponding to the event. For example, if the monitored object is central processing unit (CPU) usage, the parameter of the event may be a specific value of the CPU usage. For another example, the parameter of the event may be a quantity of occurrences of the event. For example, if the event is the alarm, the parameter of the event may be, for example, the quantity of alarm times. The parameter threshold mentioned herein may be a fixed value. For example, when the parameter is the specific value of CPU usage, the parameter threshold may be, for example, 0.9. For another example, when the parameter is the quantity of alarm times, the parameter threshold may be, for example, 3.

In addition, the first device information may include the device identifier. In this case, the first condition may also include at least one device identifier. The first server device determines that the first device information meets the first condition only when determining that the device identifier of the first server device is included in the device identifier carried in the first condition. Otherwise, because the device identifier carried in the first condition is different from the device identifier of the first server device, it indicates that the first device information does not meet the first condition. For example, when a plurality of server devices coordinately complete one or more tasks, the group of server devices may need to perform a specific processing action. Therefore, first device information corresponding to the group of server devices may include a device identifier. Correspondingly, a first condition also includes the device identifier of the group of server devices. If the first server device is one of the group of server devices, it may be determined that the first device information of the first server device meets the first condition. Further, the first server device may determine and perform the corresponding processing action. If the first server device is not one of the group of server devices, it may be determined that the first device information of the first server device does not meet the first condition. Therefore, the first server device does not need to determine and perform the corresponding processing action. This is because the processing action is a specific processing action that may be performed by the plurality of server devices that coordinately complete the one or more tasks.

The first processing action mentioned in this embodiment of this application is a response action or an operation that may be performed by the first server device when the first device information of the first server device meets the first condition. The first processing action is not specifically limited in this embodiment of this application. The first processing action may include, for example, adjusting the subscribed information, configuring a data target, or sending a notification message to the network management device. For that the subscribed information is adjusted, it should be noted that the first device information may be obtained from the subscribed information. To be specific, the first server device intercepts the subscribed information that the first server device originally needs to report to the network management device. In this case, after performing the first processing action, the first server device may adjust the first device information, for example, modify the first device information, or filter the first device information; input remaining subscribed information into publication of the subscription data; encapsulates the remaining subscribed information into an event notification; and sends the event notification to the network management device. For that the data target is configured, it means that a parameter related to the first device information or a parameter that causes sending of the first device information to change is configured. For example, when the first device information is the event alarm, and the quantity of alarm times is 2, the first processing action may be, for example, "restart". To be specific, the first server device performs a restart operation, so that the first server device clears an alarm fault. For another example, when the first device information is the event alarm, and the quantity of alarm times is 1, the first processing action may be, for example, reconfiguring a first parameter. The first parameter is a parameter that causes the alarm. For that the notification message is sent to the network management device, it should be noted that, when managing the first server device, the network management device may need to learn some special running statuses of the first server device. Therefore, the first processing action may further be sending the notification message to the network management device, so that the network management device is notified of a current running status of the first server device. It should be noted that content included in the notification message is not specifically limited in this embodiment of this application. As an example, the notification message may carry, for example, a work log of the first server device.

In addition, during actual application, the running status of the server device may be complex. In this case, when the processing action corresponding to the server device is determined, the processing action may not be a simple operation described above, for example, adjusting the subscribed information, configuring the data target, or sending the notification message to the network management device, and may alternatively continue to determine another policy that meets the condition. In other words, the first processing action may alternatively be performing a second processing action. Specifically, the first processing action may be a processing action indicating a correspondence between second device information, a second condition, and the second processing action. Correspondingly, during specific implementation of performing the first processing action, the first server device may first obtain the correspondence between the second device information, the second condition, and the second processing action, and further determine whether the second device information meets the second condition, to determine whether to perform the second processing action. When determining that the second device information meets the second condition, the first server device performs the second processing action. Similar to the first device information, the second device information may also include an event or a device identifier. Similar to the first processing action, the second processing action may be a simple operation described above, for example, adjusting the subscribed information, configuring the data target, or sending the notification message to the network management device, and may alternatively continue to determine another policy that meets the condition. For the second device information, refer to the foregoing description of the first device information. Details are not described herein again. For the second processing action, refer to the foregoing description of the first processing action. Details are not described herein again.

It should be noted that the correspondence between the first device information and the first processing action, and the correspondence between the second device information and the second processing action may be sent by the network management device to the first server device. Specifically, the network management device may send the correspondence between the first device information, the first condition, and the first processing action to the first server device. After receiving the correspondence between the first device information, the first condition, and the first processing action, the first server device may generate a script according to the received correspondence, and perform S101 to S104 by using the script. In other words, the network management device delivers an authority for processing the first device information to the first server device, so that the first server device can respond as soon as possible after obtaining the first device information. For that the authority for processing the first device information is delivered to the first server device, it should be noted that, in an implementation of this embodiment of this application, the network management device may send a first indication message to the first server device. The first indication message is used to indicate the first server device to determine the first processing action based on the first device information of the first server device. In other words, the first indication message is a message for delivering a self-management authority to the first server device. The network management device may send the first indication message to the first server device by using the NETCONF.

The network management device can be slow to respond to a network event because all monitored data objects require a resource adjustment response from the network management device. Therefore, the network management device is slower to trigger a network event including a single action. Conversely, if an ECA policy and an associated script are stored on the server device, it makes monitoring of resource adjustment easier. This means that a plurality of points on the network can immediately respond to network events. A network control logic script associated with the ECA needs to access an ECA status table. The ECA status table stores an event obtained from YANG-Push subscription or an ECA policy model.

As described above, the server device may communicate with the network management device by using the NETCONF. In this embodiment of this application, the network management device may send the correspondence between the first device information, the first condition, and the first processing action to the first server device by using the NETCONF. Specifically, the network management device may send the correspondence between the first device information, the first condition, and the first processing action to the first server device in a manner in which the network management device sends a YANG model to the first server device. For introduction of the YANG model, refer to the RFC 6020 and the RFC 7950. It may be understood that when the first device information is the event, the YANG model is an ECA model. When the first device information is the device identifier, the YANG model is a device identifier-condition-processing action model.

For the YANG model, refer to the following example. Certainly, this example is shown only for ease of understanding, and does not constitute a limitation on this embodiment of this application.

```
<rpc message-id="101 "
        xmlns="urn:ietf:params:xml:ns:netconf:base:1.0">
    <edit-config>
        <target>
            <running/>
        </target>
        <config>
            <top xmlns="http://example.com/schema/1.2/config">
    <event>
     <event-name>interface-state-monitoring</event-name>
     <type>interface-exception</type>
     <target>/if:interfaces/if:interface[if:name='eth0']</target>
     <trigger>
        <name>state-push-change</name>
        <trigger-description>received yang push
\changed notification</trigger-description>
        <test>
            <existence>/yp:notification/yp:push-change-update/yp:id[id=89]\
/yp:datastore-changes/.../yp:target="/ietf-interfaces:interfaces='eth0'\
"</existence>
        </test>
     </trigger>
     <trigger>
        <name>evaluate-in-errors</name>
        <call-event>interface-state-change</call-event>
        <trigger-description>evaluate the number of
            the packets that contained errors
        </trigger-description>
        <frequency>10m</frequency>
        <test>
            <boolean>
             <operator>greater-or-equal</operator>
             <value>100</value>
             <target>/if:interfaces/if:interface[if:name='eth0']\
/if:statistic/if:in-errors</target>
```

```
            </boolean>
        </test>
     </trigger>
     <action>
        <target>/if:interfaces/if:interface[if:name='eth0']</target>
        <value>
         <interfaces>
            <interface>
             <name>eth0</name>
             <enable>false</enable>
            </interface>
         </interfaces>
        </value>
     </action>
    </event>
   </events>
            </top>
        </config>
    </edit-config>
</rpc>
```

For example, the network management device may use the YANG-Push mechanism to deliver a policy to the server device. Event-based response behavior of the server device can be implemented by using the ECA policy. When a YANG-Push subscription filter or the ECA policy is pushed to the server device, the server device registers an event obtained from the YANG-Push subscription filter or the ECA policy model, and generates a server device-specific script. Based on the server device-specific script, the server device can autonomously respond to various network events. After event registration, the server device may subscribe to an event that is related to the ECA policy and that is in the event notification of the server device, so that all events are continuously monitored by the server device before being sent to the network management device by using the YANG-Push subscription. When the server device detects the event, the server device loads an operation status data object or an ECA policy filtered by the YANG-Push subscription to enter an automatically configured ECA event, and executes an association condition and an operation chain that are of the ECA.

In an implementation, an ECA policy event is used to describe a change of a data storage operation status. Each policy rule includes a group of conditions and a group of operations. The policy rule may be aggregated into a policy group, and a policy hierarchy is implemented by using a nesting policy. The ECA policy rule can be read as follows: When an event occurs when a condition is true, a processing action is performed. An ECA-related status is used to indicate when an event is triggered and an action that needs to be performed when the event occurs. An ECA-related status parameter is provided as follows:

```
{
    event name;
    start time;
    end time;
    filter node;
    threshold value;
    comparison operator;
    action class;
}
```

For ease of description, in the following description of the embodiment of this application, the correspondence, sent by the network management device to the first server device, between the first device information, the first condition, and the first processing action is referred to as a policy. The following describes the policy sent by the network management device to the first server device by using an example. Table 1 is an example of the policy sent by the network management device to the first server device. The policy shown in Table 1 is an event-condition-processing action policy.

TABLE 1

| Event | Condition | Processing action |
| --- | --- | --- |
| CPU usage | Greater than 0.8 | Restart a device |
| Memory usage | Greater than 0.8 | Report data in a memory |
| Alarm | More than three times | Report a log |

It may be understood that if obtaining the value of the CPU usage, the first server device may further determine whether the CPU usage is greater than 0.8. When the CPU usage is greater than 0.8, the first server device may perform the restart operation. Similarly, if obtaining the value of the memory usage, the first server device may further determine whether the memory usage is greater than 0.8. When the memory usage is greater than 0.8, the first server device may perform the operation of reporting data in the memory to the network management device. If obtaining the alarm, the first server device may further determine whether the quantity of alarm times is more than three times. When the quantity of alarm times is more than three times, the first server device may perform the operation of reporting a log to the network management device.

If an event triggers another policy, that is, the server device further performs a processing action, a group of events may be combined in an association manner and performed. Processing actions associated with the event may be performed on a same network device, or processing actions may be performed on different network devices. In the latter case, the performed events are coordinated by different network devices into one group to implement a task.

Table 2 is an example of the policy sent by the network management device to the first server device. The policy shown in Table 2 is a device identifier-condition-processing action policy.

TABLE 2

| Device identifier | Condition | Processing action |
| --- | --- | --- |
| 10.1.1.1 | Device IP address is 10.1.1.1, | Deploy a |
| 10.1.1.2 | 10.1.1.2, or 10.1.1.3 | blacklist |
| 10.1.1.3 | | |

It may be understood that, the first server device may determine whether the device identifier of the first server device exists in the device identifier included in the policy. If the device identifier of the first server device is 10.1.1.1, that is, the device identifier exists in the device identifier included in the policy, the first server device may perform the operation of deploying a blacklist.

Table 3 is an example of the policy sent by the network management device to the first server device. The policy shown in Table 3 is a device identifier-condition-processing action policy, and the processing action is continuing to determine another policy that meets the condition, namely, an example of a simple-level policy.

TABLE 3

| Policy identifier | Event | Condition | Processing action |
| --- | --- | --- | --- |
| a | CPU usage | Greater than 0.8 | Continue to determine a policy b |
| b | Memory usage | Greater than 0.8 | Greater than 0.8 |

It may be understood that, when the policy received by the first server device is shown in Table 3, the network device generates and stores a script. If obtaining the value of the CPU usage, the first server device may further determine whether the CPU usage is greater than 0.8. When the CPU usage is greater than 0.8, the first server device may perform the operation of continuing to determine a policy b, that is, continuing to determine whether the value of the memory usage is greater than 0.8. When the memory usage is greater than 0.8, the first server device may perform the operation of reporting data in a memory to the network management device.

Table 4 is an example of the policy sent by the network management device to the first server device. The policy shown in Table 4 is a device identifier and an event-condition-processing action policy.

TABLE 4

| Policy identifier | Event and device identifier | Condition | Processing action |
| --- | --- | --- | --- |
| d | CPU usage and 10.1.1.1 | Greater than 0.8 | Restart a device |
| e | CPU usage and 10.1.1.1 | Less than or equal to 0.8 | Deploy a blacklist |

It may be understood that, when the policy received by the first server device is shown in Table 4, if obtaining the value of the CPU usage, the first server device may further determine whether the CPU usage is greater than 0.8, and determine whether the device identifier of the first server device exists in the device identifier included in the policy. When the CPU usage is greater than 0.8 and the device identifier of the first server device exists in the device identifier included in the policy, the first server device may perform the restart operation. Similarly, if obtaining the value of the CPU usage, the first server device may further determine whether the CPU usage is greater than 0.8, and determine whether the device identifier of the first server device exists in the device identifier included in the policy. When the CPU usage is less than or equal to 0.8 and the device identifier of the first server device exists in the device identifier included in the policy, the first server device may perform the operation of deploying a blacklist.

It should be noted that Table 1 to Table 4 are shown only for ease of understanding, and do not constitute a limitation on this embodiment of this application. In this embodiment of this application, the event, the device identifier, the condition, and the processing action are not limited to the content shown in Table 1 to Table 4. Details are not enumerated herein one by one.

During actual application, the network management device may subscribe to the event of the first server device, to determine the running status of the first server device, and in particular, determine whether the first server device runs abnormally. For example, as described above, the network management device may send the first subscription message to the first server device by using the NETCONF. The first subscription message is used to indicate the first server device to report corresponding data or information, for example, a corresponding event, to the network management device. It may be understood that, if the first server device reports all events to the network management device, the network management device receives, stores, and processes a large volume of data. Usually, when the parameter of the event is greater than or equal to the preset threshold, the event may better reflect whether the first server device runs abnormally. In view of this, in an implementation of this embodiment of this application, the first server device may send the event to the network management device when the parameter of the event is greater than or equal to the preset threshold. In this way, the network management device is enabled to determine the running status of the first server device, and the volume of data received, stored, and processed by the network management device is reduced. In other words, management efficiency of the network management device is considered. For the parameter of the event, refer to the foregoing description. Details are not described herein again.

It may be understood that, during actual application, when the first processing action is determined based on the first device information of the first server device, an important objective is that performance of the first server device is improved after the first server device performs the determined first processing action. The performance of the first server device is improved after the first server device performs the determined first processing action. In an implementation of this embodiment of this application, the first processing action may be comprehensively determined with reference to a plurality of events of the first server device. Specifically, there may be a plurality of implementations when the corresponding processing action is determined with reference to the plurality of events. The following describes two possible implementations.

In a first implementation, during actual application, a specific processing action to be taken may be determined only when the plurality of events occur at the same time. Therefore, in an implementation of this embodiment of this application, a corresponding processing action may be determined with reference to a plurality of events obtained by the first server device at a moment. Specifically, during actual application, moments at which the first server device obtains the plurality of events cannot be completely consistent. When a difference between obtaining moments of two events is small, it may be considered that the moments at which the first server device obtains the two events are a same moment. In other words, when a difference between obtaining moments of any two of the plurality of events is less than or equal to a first time threshold, it may be considered that the moments at which the first server device obtains the plurality of events are a same moment. The first time threshold mentioned herein is a small value. A specific value of the first time threshold may be determined based on an actual situation, for example, determined based on a frequency at which the first server device obtains the event. This is not specifically limited herein.

For example, the first device information includes a first event and a second event. When obtaining the first event and the second event of the first server device at a moment t1, the first server device may determine whether the first event meets a first sub-condition and whether the second event meets a second sub-condition; and when the first event meets the first sub-condition and the second event meets the second sub-condition, determine and perform the first processing action. For example, when determining that the CPU usage of the first server device is greater than 0.8 and the memory usage of the first server device is greater than 0.8, the first server device determines and performs the first processing action.

It should be noted that, although the foregoing description is provided by using an example in which the first device information includes the two events: the first event and the second event, this is merely shown for ease of understanding, and does not constitute a limitation on this embodiment of this application. In addition to including the two events, the events mentioned herein may include more than two events. Details are not enumerated herein one by one.

In a second implementation, during actual application, the specific processing action to be taken may be determined only when the plurality of events successively occur in a period of time. Therefore, in an implementation of this embodiment of this application, a corresponding processing action may be determined with reference to an event corresponding to the first server device in a period of time. Specifically, at least two events exist in the plurality of events of the first server device. A difference between occurrence moments of the two events is greater than a first time threshold and less than or equal to a second time threshold. In this embodiment of this application, the occurrence moment of the event may be reflected by a moment at which the first server device obtains the event. In other words, a difference between obtaining moments of the two events is greater than the first time threshold and less than or equal to the second time threshold. In other words, in a plurality of obtaining moments corresponding to the plurality of events obtained by the first server device, a time difference between the at least two obtaining moments is less than the second time threshold. That is, the at least two obtaining moments are located in a period of time. The second time threshold is not specifically limited in this embodiment of this application. The second time threshold is a value greater than the first time threshold. A specific value of the second time threshold may be determined based on an actual situation.

The second implementation may be understood with reference to Table 5. Table 5 shows a correspondence between an event, a condition, and a processing action.

TABLE 5

| Policy identifier | Event | Condition | Processing action |
|---|---|---|---|
| m | CPU usage and memory usage | Greater than 0.8, greater than 0.8, and an event interval less than 30 seconds | Restart a device |

It can be learned from the policy m in Table 5, if obtaining the CPU usage at a moment t1 and obtaining the memory usage at a moment t2, the first server device may determine whether the CPU usage is greater than 0.8, whether the memory usage is greater than 0.9, and whether a difference between the moment t1 and the moment t2 is less than 30 seconds. If the CPU usage is greater than 0.8, the memory usage is greater than 0.9, and the difference between the moment t1 and the moment t2 is less than 30 seconds, the first server device may determine that the event meets the first condition, and therefore may determine and perform the first processing action, that is, the first server device may perform the restart operation.

It should be noted that Table 5 is merely shown for ease of understanding, and does not constitute a limitation on this embodiment of this application. Although events shown in Table 5 include the two events, this is shown only for ease of understanding, and does not constitute a limitation on this embodiment of this application. The events may further include more than three events. Details are not enumerated herein one by one. When there are a plurality of events, a relationship between obtaining moments of the plurality of events is not specifically limited in this embodiment of this application, provided that a difference between obtaining moments of two events is greater than the first time threshold and less than or equal to the second time threshold. Details are not enumerated herein one by one.

As described above, in this embodiment of this application, the policy may be sent by the network management device to the first server device. In one aspect, as described above, one network system may include a large quantity of server devices. Therefore, if the network management device separately sends the policy to each server device, most resources of the network management device are occupied. In another aspect, during actual application, events included in a plurality of server devices are similar. Correspondingly, processing actions that the plurality of server devices may need to perform are also similar. For ease of description, a server device group including the plurality of server devices is referred to as a first device set. In other words, policies sent by the network management device to the server devices in the first device set may be the same. In view of this, in an implementation of this embodiment of this application, to reduce the resources occupied by the network management device to send the policy to the server device, the network management device may send the policy to one or some of the server devices in the first device set. For ease of description, in this embodiment of this application, "a server device that obtains the policy from the network management device" is referred to as a server device representative. Then, the server device representative receives the policy from the network management device, and sends the policy to another server device in the first device set. In other words, in an implementation of this embodiment of this application, the first server device may be the server device representative in the first device set. After receiving the foregoing policy from the network management device, the first server device may send the policy, namely, the correspondence between the first device information, the first condition, and the first processing action, to a second server device in the first device set.

It should be noted that, in this embodiment of this application, the first server device may send the policy to the second server device by using the NETCONF. Certainly, the first server device may alternatively send the policy to the first server device by using a proprietary protocol or a multicast protocol. This is not specifically limited in this embodiment of this application. After receiving the policy from the first server device, the second server device may also have a device self-management capability like the first server device. In other words, the second server device may also perform the device management method performed by the first server device shown in S101 to S103.

As described above, by defining and designing the ECA policy rule in the network management system, the network management device can extract an event and a condition in the ECA model, and fill the event and the condition in the YANG-Push subscription filter. After the YANG-Push subscription filter carrying the event and the condition is pushed to the server device, the server device can automatically generate an ECA script. When detecting a network event, the server device intercepts the event in subscription data, loads a running status data object to an automatically configured ECA event, and executes an ECA-related condition. If the ECA condition is true, the running status data object is deleted and remaining data objects are returned to the subscription data. The server device encapsulates the subscription data into a notification message, and the server device sends the notification message to the management device. In addition, the server device may further update the ECA policy rule to add a new ECA policy. The network management device may directly send the ECA model to the server device, and the server device generates a specific script based on the ECA model. The server device registers an event in the ECA policy and subscribes to a running status database of the server device. The running status database is encapsulated in an event notification including the YANG-Push subscription.

Once detecting an event, the server device loads a running status data object to an automatically configured ECA event, and executes an ECA-related condition. Different from the YANG-Push subscription filter, the server device may not intercept the publication of the subscription data. Instead, the server device may be allowed to trigger a set of actions associated with the network event, for example, sending an ECA log report notification and adding/deleting the YANG-Push subscription. After the server device performs all processing actions, the server device may send the notification message to the network management device. In some cases, events are performed by a same server device or different server devices. Therefore, the server devices may perform the events in a coordinated manner.

In an implementation of this embodiment of this application, during actual application, events that may be included in a plurality of server devices of a same device type are similar. In view of this, device types corresponding to the server devices in the first device set are the same. In other words, a device type of the first server device is the same as a device type of the second server device. The device type may be determined by using a physical form of the server device, may be determined by using a version of a software program mounted on the server device, or may be determined by using two factors: a physical form of the server device and a version of a software program mounted on the server device. In other words, that device types corresponding to the first server device and the second network device are the same may be that a physical form of the first server device is the same as a physical form of the second server device, or a version of a software program mounted on the first server device is the same as a version of a software program mounted on the second server device. The physical form mentioned herein includes but is not limited to physical forms such as a router, a switch, and a firewall.

In still another implementation of this embodiment of this application, during actual application, if a plurality of server devices are located in a same management domain, for example, in a same autonomous domain (AS), events included in the plurality of server devices may be similar. In view of this, the server devices in the first device set may belong to a same management domain. In other words, the first server device and the second server device belong to a same management domain.

As described above, in this embodiment of this application, for the first device set, the network management device may first send the policy to the server device representative in the first device set, and the server device representative in the first device set sends the policy to another server device in the first device set. It may be understood that one network system may include a large quantity of server devices. The server devices in the network system may form a plurality of device sets. To be specific, in addition to the first device set, the network system may further include a second device set, even a third device set, or the like. It may be understood that events corresponding to different device sets may be different. Correspondingly, processing actions that need to be taken on the device sets may also be different. In other words, policies matching different device sets may be different. If the network management device sends all policies to the server device representative, namely, the first server device, in the first device set, the network management device sends a large volume of data to the first server device, and the first server device may match only some of the policies. In view of this, in an implementation of this embodiment of this application, the network management device may send, to the first server device, a policy matching the first device set, to reduce the volume of data sent by the network management device to the first server device.

Specifically, the network management device may first determine the policy matching the first device set, and then send the policy matching the first device set to the first server device. In this embodiment of this application, to enable the network management device to determine the policy matching the first device set, the first server device may send the first device information of the first server device to the network management device. After receiving the first device information of the first server device, the network management device may match the first device information of the first server device with a policy stored in the network management device, determine the policy matching the first device information of the first server device from all policies stored in the network management device, and determine the policy matching the first device information of the first server device as the policy matching the first device set. Further, the network management device sends the determined policy matching the first device set to the first server device.

After the first server device receives the policy from the network management device, in one aspect, the first server device may send the received policy to the second server device. In another aspect, the first server device may perform the first processing action included in the policy.

It may be understood that, during actual application, events included in the first device information reported by the first server device to the network management device at a time are limited. Therefore, in an implementation of this embodiment of this application, the first server device may periodically obtain the first device information, in particular, the event, of the first server device. Because the device identifier is determined, the first device information may be obtained only once. Then, the first server device may periodically report the first device information of the first server device to the network management device. Correspondingly, the first server device may periodically receive the policy from the network management device. In addition, a same event may exist in events periodically obtained by the first server device. In this case, because the first server device already includes a processing action corresponding to the event, the first server device may no longer send the event to the network management device. Therefore, the network management device is prevented from repeatedly sending a same policy to the first server device. For example, at the moment t1, the first server device sends the first device information to the network management device, and receives a first policy from the network management device. At the moment t2, first device information obtained by the first server device is the same as the first device information obtained at the moment t1. In this case, the first server device determines, from policies stored in the first server device, a policy that already exists in a policy corresponding to the first device information. In this case, the first server device no longer reports the first device information to the network management device, but directly determines and performs the first processing action based on the policy corresponding to the first device information. Certainly, alternatively, the first server device may optionally report, to the network management device, a result of performing the first processing action. This is not specifically limited in this embodiment of this application.

It may be understood that the events of the first server device are limited, and the events may not include events that may occur on all server devices in the first device set. The policy sent by the network management device to the first server device is determined based on the first device information of the first server device. To make the policy sent by the network management device to the first server device more comprehensive, in this embodiment of this application, the server device representative may further be determined from the first device set. The server device representative means that the first device information represented by the server device, in particular, the event, is comprehensive.

It should be noted that, in this embodiment of this application, the network management device may determine the server device representative from the first device set, or the server device in the first device set may determine the server device representative from the first device set. The following separately describes two specific implementations of determining the server device representative from the first device set.

In this embodiment of this application, regardless of whether the network management device determines the server device representative in the first device set or the server device determines the server device representative in the first device set, the server devices included in the first device set need to be first determined. In other words, another server device whose device type is the same as the device type of the first server device is determined, or another server device whose identifier is the same as the identifier of the first server device is managed. This operation may be performed by the network management device, because the network management device may manage the server devices.

Specifically, the server devices such as the first server device and the second server device may send third device information of the server devices to the network management device. After receiving a second subscription message from the network management device, the server devices may send the third device information to the network management device. The second subscription message may be delivered by using the YANG model. The third device information may include a device type, may include a management domain identifier, or may include both a device type and a management domain identifier. A management domain identifier of a server device is an identifier of a management domain of the server device, and the management domain identifier may be, for example, an AS number. After receiving the third device information from the server devices, the network management device may store the third device information of the server devices in a corresponding database. Then, the network management device divides the server devices into one or more device sets based on the third device information of the server devices. For example, server devices of a same device type are divided into a device set. For another example, server devices with a same management domain identifier are divided into a device set. Then, the network management device separately determines a server device representative for each server device set. To be specific, the network management device may determine, based on the third device information of the first server device and the third device information of the second server device, that the first server device and the second server device belong to the first device set.

The following describes specific implementations of determining, by the network management device, the server device representative from the first device set.

The network management device may obtain fourth device information of the server devices. The fourth device information may include an active/standby status of the server device, the fourth device information may include data traffic passing through the server device, or the fourth device information may include an active/standby status of the server device and data traffic passing through the server device. Specifically, the network management device may send a third subscription message to the server devices. After receiving the third subscription message, the server devices send the fourth device information to the network management device. After receiving the fourth device information from the server devices such as the first server device and the second server device, the network management device determines the server device representative in the first device set based on the fourth device information of the server devices in the first device set. The third subscription message is similar to the second subscription message, and may also be delivered by using the YANG model. Details are not described herein again. The network management device determines the server device representative in the first device set based on the fourth device information of the server devices in the first device set. For example, the network management device may determine, from the fourth device information of the server devices, fourth device information that meets a preset condition, and therefore determine a server device corresponding to the fourth device information that meets the preset condition as the server device representative. For the preset condition, it should be noted that, during actual application, a data processing volume of an active device is large, and therefore a large quantity of events may occur on the active device. Therefore, in this embodiment of this application, that the fourth device information meets the preset condition may be, for example, that the active/standby status is the "active device". In another aspect, during actual application, larger data traffic passing through the server device indicates more events that may occur on the server device. Therefore, in an implementation of this embodiment of this application, that the fourth device information meets the preset condition may be, for example, that the data traffic passing through the server device is greater than traffic passing through another server device. Certainly, during actual application, there may be a plurality of server devices whose active/standby statues are the "active device" in the first device set. In this case, the plurality of server devices may all be determined as server device representatives. Certainly, alternatively, with reference to data traffic passing through the plurality of server devices, one server device representative may be determined from the plurality of server devices whose device statuses are the "active device". For example, it may be understood with reference to Table 6 below. In Table 6, active/standby statues of a server device 1 and a server device 2 are active devices. However, data traffic passing through the server device 1 is 300 M, and data traffic passing through the server device 2 is 500 M. In this case, the server device 2 may be determined as the server device representative.

TABLE 6

|  | Active/Standby status | Data traffic |
| --- | --- | --- |
| Server device 1 | Active device | 300M |
| Server device 2 | Active device | 500M |

After determining the server device representative, for example, the first server device, in the first device set, the network management device may send a device identifier of another server device, for example, the second server device, in the first device set to the first server device. Specifically, the network management device may send the device identifier of the other server device, for example, the second server device, to the first server device by using the YANG model. After receiving the device identifier of the other server device, the first server device may perform a step of sending the first device information of the first server device to the network management device. In addition, after receiving a policy from the network management device, the first server device may send the policy to the other server device (for example, the second server device) based on the device identifier of the other server device determined by the network management device.

The following describes specific implementations in which the server device determines the server device representative from the first device set.

After the network management device determines the server devices included in the first device set, the network management device sends a device identifier of another device in the first device set to the server devices in the first device set. For example, the first device set includes three server devices: a server device 1, a server device 2, and a server device 3. The network management device sends device identifiers of the server device 1 and the server device 2 to the server device 3. The network management device sends device identifiers of the server device 2 and the server device 3 to the server device 1. The network management device sends device identifiers of the server device 1 and the server device 3 to the server device 2. In this way, each server device in the first device set obtains device identifiers of all server devices in the first device set by using the network management device. Then, each server device in the first device set may perform a same step of determining the server device representative, that is, sending an information obtaining request to the other server device based on the device identifier of the other server device in the first device set. The information obtaining request is used to indicate the other server device to feed back fourth device information of the other server device. Then, the fourth device information from the other server device is received. For example, the first server device may send the information obtaining request to the second server device according to the NETCONF, and receive the fourth device information from the second server device. Correspondingly, the second server device may send the information obtaining request to the first server device by using the NETCONF, and receive the fourth device information from the first server device. After obtaining fourth device information of other server devices in the first device set, the server devices in the first device set may determine the server device representative by comparing the fourth device information of the server devices in the first device set. For a specific implementation in which the server device determines the server device representative based on the fourth device information of the server devices, refer to a specific implementation in which the network management device determines the server device representative based on the fourth device information of the server devices. Details are not described herein again.

It should be noted that the information obtaining request may be constructed by using the following YANG model.

```
<rpc netconf:message-id="101"
      xmlns:netconf="urn:ietf:params:xml:ns:netconf:base:1.0">
      <establish-subscription
           xmlns="urn:ietf:params:xml:ns:yang:ietf-subscribed-
           notifications">
           <stream-subtree-filter>
           <device-info xmlns="urn:ietf:params:xml:ns:yang:device-
info">
              <device-status>
              <master-slave>master</master-slave>
              <total-traffic>
                <received-bytes>1000</received-bytes>
              </total-traffic>
              </device-status>
              </device-info>
           </stream-subtree-filter>
           <period
xmlns="urn:ietf:params:xml:ns:yang:ietf-yang-push:1.0">500</period>
         </establish-subscription>
      </rpc>
  module device-info {
      yang-version 1.1;
      namespace "urn:ietf:params:xml:ns:yang:device-info";
      container device-status {
      leaf master-slave {
      type string;
      }
      container total-traffic {
      leaf received-bytes {
      type unit64;
      }
      }
      }
  }
```

The device management method according to the embodiment of this application is described above. The following describes the device management method according to the embodiment of this application with reference to the scenario shown in FIG. 1 and a signaling interaction diagram shown in FIG. 3A and FIG. 3B.

Figure 3A:
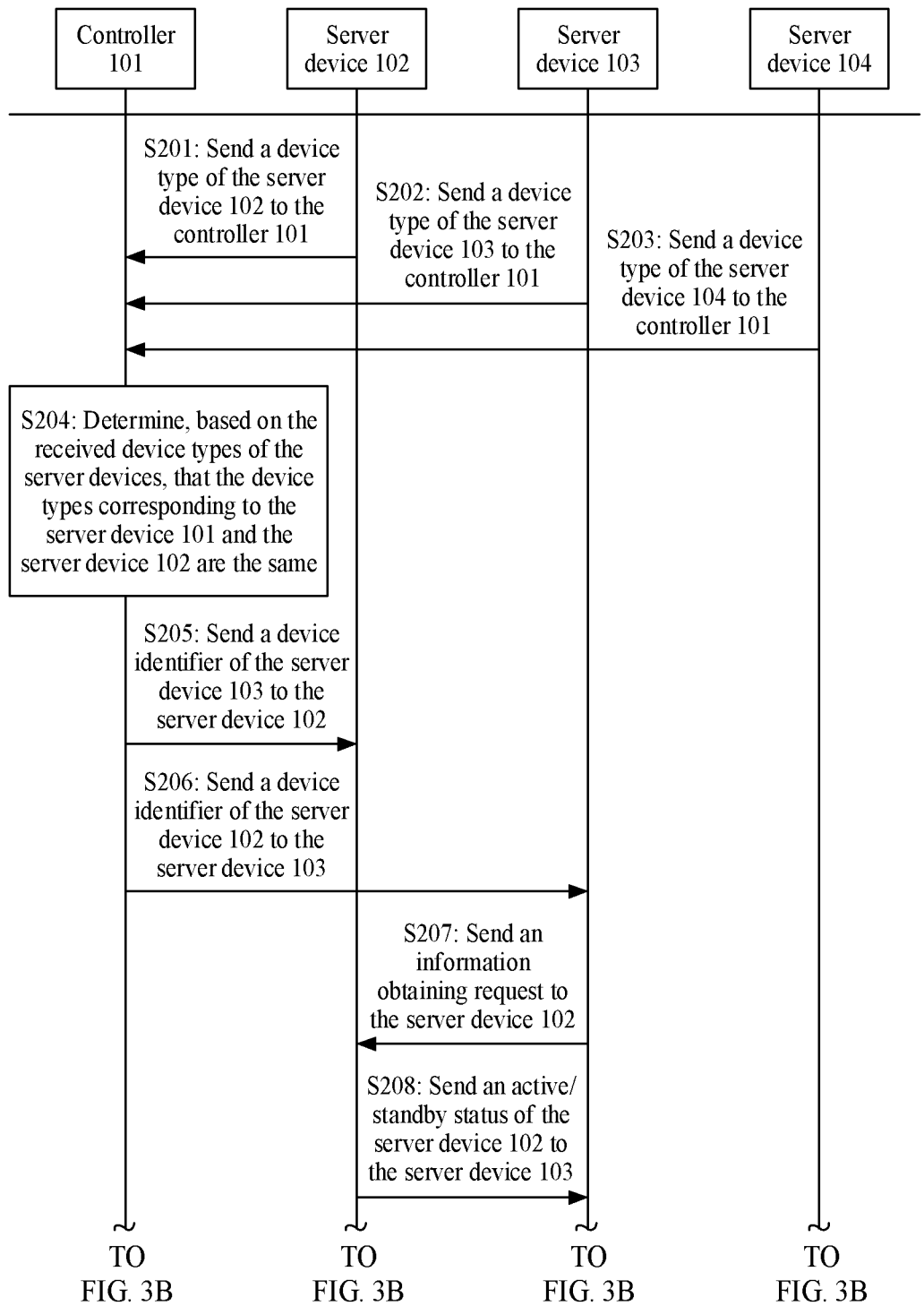
FIG. 3A and FIG. 3B are a signaling exchange diagram of a device management method according to an embodiment of this application.
Figure 3B:
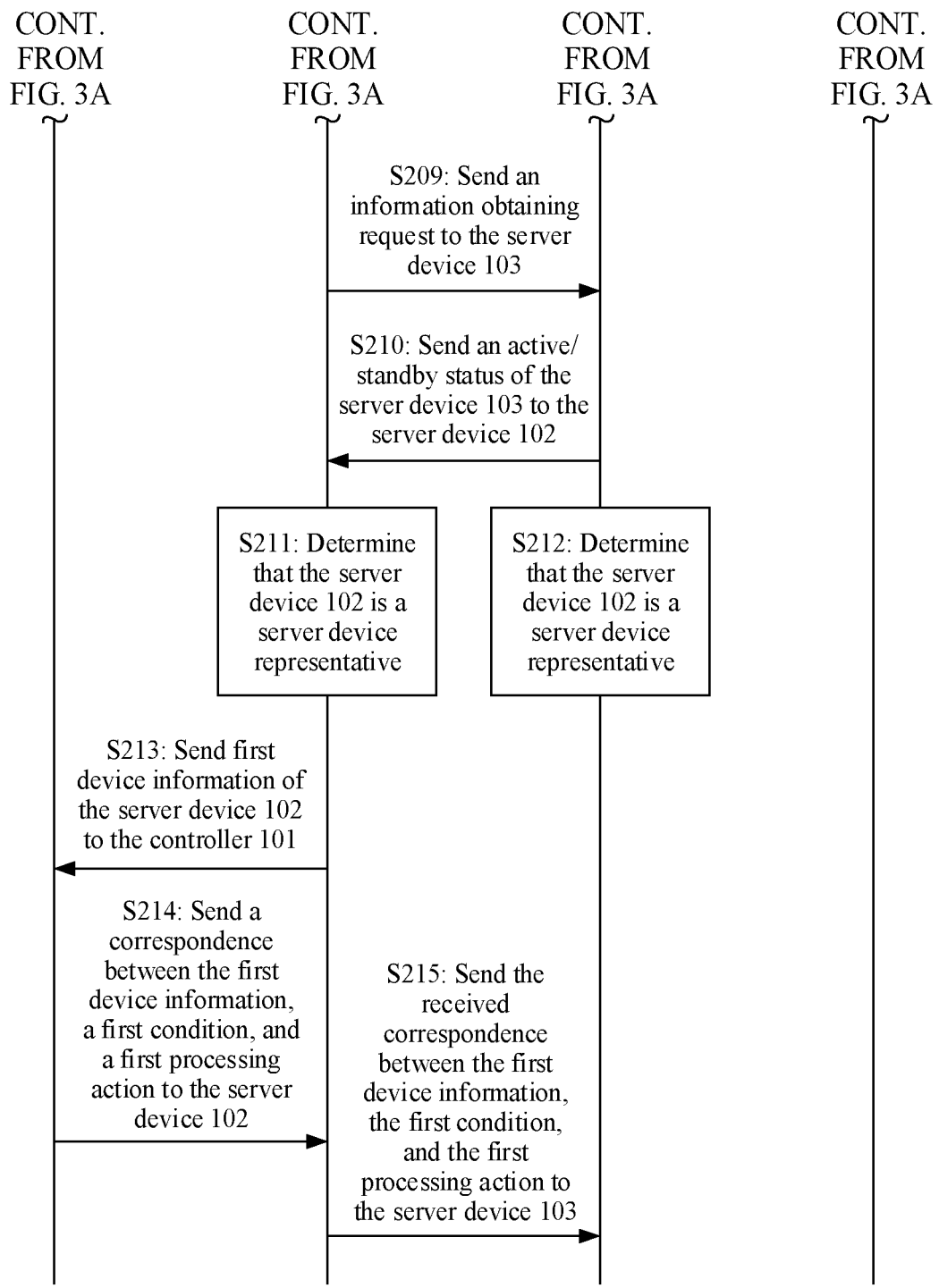

FIG. 3A and FIG. 3B are a signaling exchange diagram of a device management method according to an embodiment of this application. The device management method shown in FIG. 3A and FIG. 3B may be implemented, for example, by using the following S201 to S215.

S201: The server device 102 sends a device type of the server device 102 to the network management device 101.

S202: The server device 103 sends a device type of the server device 103 to the network management device 101.

S203: The server device 104 sends a device type of the server device 104 to the network management device 101.

A sequence of performing S201 to S203 is not specifically limited in this embodiment of this application, and may alternatively be another sequence. For example, S201 to S203 may be performed at the same time, or S201 is performed between S202 and S203. Details are not enumerated herein one by one.

S204: The network management device 101 determines, based on the received device types of the server devices, that the device types corresponding to the server device 103 and the server device 102 are the same.

For example, both the server device 103 and the server device 102 are routing devices.

S205: The network management device 101 sends a device identifier of the server device 103 to the server device 102.

S206: The network management device 101 sends a device identifier of the server device 102 to the server device 103.

A sequence of performing S205 and S206 is not specifically limited in this embodiment of this application.

S207: The server device 103 sends an information obtaining request to the server device 102.

S208: The server device 102 sends an active/standby status of the server device 102 to the server device 103.

S209: The server device 102 sends an information obtaining request to the server device 103.

S210: The server device 103 sends an active/standby status of the server device 103 to the server device 102.

S211: The server device 102 determines that the server device 102 is a server device representative.

S212: The server device 103 determines that the server device 102 is a server device representative.

The active/standby status of the server device 102 is an "active device", and the active/standby status of the server device 103 is a "standby device". Therefore, it is determined that the server device 102 is the server device representative.

S213: The server device 102 sends first device information of the server device 102 to the network management device 101.

S214: The network management device 101 sends a correspondence between the first device information, a first condition, and a first processing action to the server device 102.

S215: The server device 102 sends the received correspondence between the first device information, the first condition, and the first processing action to the server device 103.

After receiving the correspondence between the first device information and the processing action, the server device 102 may further perform the received first processing action. In addition, the server device 102 may further periodically perform the device management method shown in FIG. 2. Herein, the server device 102 may correspond to the first server device in FIG. 2.

After S215, the server device 103 may also periodically perform the device management method shown in FIG. 2. Herein, the server device 103 may correspond to the first server device in FIG. 2.

It should be noted that, in the signaling interaction diagram shown in FIG. 3A and FIG. 3B, the server device 102 and the server device 103 determine the server device representative from a first device set. As described above, alternatively, the network management device may determine the server device representative from the first device set. For an implementation in which the network management device determines the server device from the first device set, refer to the foregoing description. Details are not described herein with reference to a specific scenario.

In addition, for the server device 104, because the device type of the server device 104 is different from the device type of the server device 103 and the device type of the server device 102, the server device 104 may directly send first device information of the server device 104 to the network management device 101, and receives a corresponding correspondence between the first device information, a first condition, and a first processing action from the network management device. After receiving the correspondence, the server device may also periodically perform the device management method shown in FIG. 2. Herein, the server device 104 may correspond to the first server device in FIG. 2.

Based on the device management method according to the foregoing embodiment, an embodiment of this application further provides a device management apparatus. The following describes the apparatus with reference to accompanying drawings.

Figure 4:
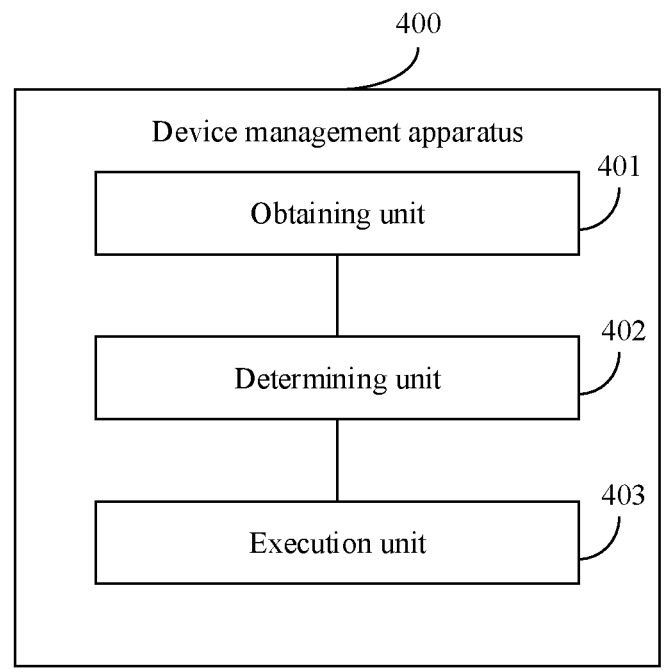
FIG. 4 is a schematic diagram of a structure of a device management apparatus according to an embodiment of this application.

FIG. 4 is a schematic diagram of a structure of the device management apparatus according to the embodiment of this application.

The device management apparatus 400 shown in FIG. 4 is configured to perform the device management method performed by the first server device according to the foregoing embodiment. For example, the device management apparatus 400 may be configured to perform the steps S101 to S104 shown in FIG. 2 and the step performed by the server device 102 shown in FIG. 3A and FIG. 3B. The device management apparatus 400 shown in FIG. 4 may include, for example, an obtaining unit 401, a determining unit 402, and an execution unit 403.

The obtaining unit 401 is configured to obtain first device information of a first server device. The first device information includes an event or a device identifier. The determining unit 402 is configured to determine a first condition corresponding to the first device information. The determining unit 402 is further configured to determine that the first device information meets the first condition. The execution unit 403 is configured to perform a first processing action corresponding to the first device information when the determining unit 402 determines that the first device information meets the first condition.

In an implementation, the apparatus 400 further includes a receiving unit. The receiving unit is configured to receive, from a network management device, a correspondence between the first device information, the first condition, and the first processing action.

In an implementation, the obtaining unit 401 is specifically configured to: obtain the first device information from a database of the first server device, or obtain the first device information from subscribed information of the first server device.

In an implementation, when the first device information includes the event, the first condition includes a parameter and a parameter threshold, and the determining unit 402 is specifically configured to determine that a parameter of the event is greater than or equal to the parameter threshold.

In an implementation, when the first device information includes the device identifier of the first server device, the first condition includes at least one device identifier, and the determining unit 402 is specifically configured to determine that the at least one device identifier included in the first condition includes the device identifier of the first server device.

In an implementation, the first processing action includes: adjusting the subscribed information, configuring a target parameter, or sending a notification message to the network management device.

In an implementation, the first processing action includes a policy for indicating the first server device to perform a second processing action. Correspondingly, the execution unit 403 is specifically configured to: obtain a correspondence between second device information, a second condition, and the second processing action; determine the second condition corresponding to the second device information; determine that the second device information meets the second condition; and perform the second processing action in response to determining that the second device information meets the second condition.

In an implementation, when the first device information includes the event, the apparatus 400 further includes a sending unit. The sending unit is configured to send the event to the network management device when determining that the parameter of the event is greater than or equal to a preset threshold.

In an implementation, the sending unit is further configured to send third device information of the first server device to the network management device, the third device information includes a device type of the first server device or a management domain identifier corresponding to the first server device, the third device information of the first server device is used to indicate the network management device to determine a first device set, the first device set includes at least the first server device and one or more other server devices, and the first server device and the one or more other server devices have a same device type or a same management domain identifier.

In an implementation, the sending unit is further configured to send fourth device information of the first server device to the network management device, the fourth device information of the first server device includes an active/standby status of the first server device or data traffic passing through the first server device, and the fourth device information of the first server device is used to indicate the network management device to determine a server device representative from the first device set.

In an implementation, the receiving unit is further configured to receive fourth device information of a second server device, the fourth device information of the second server device includes an active/standby status of the second server device or data traffic passing through the second server device. The determining unit is further configured to determine, based on the fourth device information of the second server device, that the first server device is a server device representative.

In an implementation, the sending unit is further configured to send the correspondence between the first device information, the first condition, and the first processing action to the second server device that belongs to a same device set as the first server device, the first server device and the second server device belong to the first device set, and the first server device is the server device representative in the first device set.

In an implementation, a device type of the second server device is the same as the device type of the first server device; or a management domain identifier of the second server device is the same as the management domain identifier corresponding to the first server device.

In an implementation, the event of the first server device includes a plurality of events, and a difference between obtaining moments of any two of the plurality of events is less than or equal to a first time threshold.

In an implementation, the event of the first server device includes a plurality of events, at least two types of events exist in the plurality of events, and a difference between obtaining moments of the two types of events is greater than a first time threshold and less than or equal to a second time threshold.

Because the apparatus 400 is an apparatus corresponding to the device management method performed by the first server device in the foregoing method embodiment. Specific implementations of units in the apparatus 400 are based on a same concept as the foregoing method embodiment.

Therefore, for the specific implementations of the units in the apparatus 400, refer to the description part in the foregoing method embodiment. Details are not described herein again. For example, for the specific implementation of the obtaining unit 401, refer to the foregoing related description of S101; for the specific implementation of the determining unit 402, refer to the foregoing related description of S102 and S103; for the specific implementation of the execution unit 403, refer to the foregoing related description of S104; and the like.

An embodiment of this application further provides a server device. The device includes a processor and a memory.

The memory is configured to store instructions.

The processor is configured to execute the instructions in the memory, to perform the device management method performed by the first server device in the foregoing method embodiment.

Figure 5:
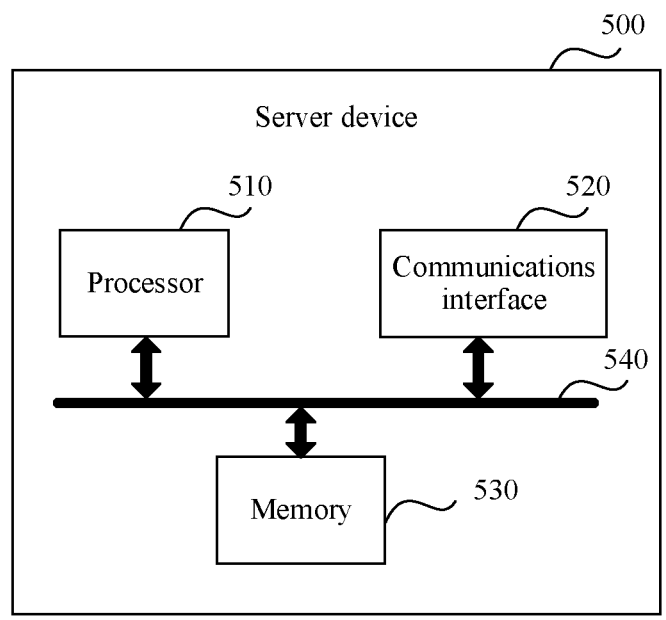
FIG. 5 is a schematic diagram of a structure of a server device according to an embodiment of this application.

It should be noted that a hardware structure of the foregoing mentioned server device may be a structure shown in FIG. 5. FIG. 5 is a schematic diagram of a structure of a server device according to an embodiment of this application.

Refer to FIG. 5. The server device 500 includes a processor 510, a communications interface 520, and a memory 530. There may be one or more processors 510 in the server device 500. In FIG. 5, one processor is used as an example. In this embodiment of this application, the processor 510, the communications interface 520, and the memory 530 may be connected by using a bus system or in another manner. In FIG. 5, a connection by using a bus system 540 is used as an example.

The processor 510 may be a CPU, a network processor (NP), or a combination of the CPU and the NP. The processor 510 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. In this embodiment of this application, for example, the processor 510 may be configured to perform operations performed by units such as the obtaining unit 401, the determining unit 402, and the execution unit 403.

The memory 530 may include a volatile memory, for example, a random-access memory (RAM). Alternatively, the memory 530 may include a non-volatile memory, for example, a flash memory, a hard disk drive (HDD), or a solid-state drive (SSD). Alternatively, the memory 530 may further include a combination of the foregoing types of memories. The memory 530 may store the foregoing correspondence between the first device information, the first condition, and the first processing action, and the like mentioned in the foregoing embodiment.

Optionally, the memory 530 stores an operating system and a program, an executable module or a data structure, a subset thereof, or an extension set thereof. The program may include various operation instructions for implementing various operations. The operating system may include various system programs, to implement various basic services and process hardware-based tasks. The processor 510 may read the program in the memory 530, to implement the device management method according to the embodiment of this application.

The bus system 540 may be a Peripheral Component Interconnect (PCI) bus, an Extended Industry Standard Architecture (EISA) bus, or the like. The bus system 540 may be classified into an address bus, a data bus, a control bus, and the like. For ease of representation, only one thick line is used to represent the bus in FIG. 5, but this does not mean that there is only one bus or only one type of bus.

An embodiment of this application further provides a computer-readable storage medium. The computer-readable storage medium includes instructions, and when the instructions are run on a computer, the computer is enabled to perform the device management method performed by the first server device in the foregoing method embodiment.

An embodiment of this application further provides a computer program product including a program. When the computer program product runs on a computer, the computer is enabled to perform the device management method performed by the first server device in the foregoing method embodiment.

An embodiment of this application further provides a device management system. The system includes a network management device and a first server device. The network management device is configured to send a correspondence between first device information, a first condition, and a first processing action to the first server device. The network management device may be, for example, the network management device 101 shown in FIG. 1, and the first server device may be, for example, any one of the server device 102, the server device 103, and the server device 104 shown in FIG. 1.

The first server device is configured to perform the device management method performed by the first server device in the foregoing method embodiment.

In an implementation, the system further includes a second server device. The first server device is further configured to send the correspondence between the first device information, the first condition, and the first processing action to the second server device, the first server device and the second server device belong to a first device set, and the first server device is a server device representative in the first device set. When the first server device is the server device 102 shown in FIG. 1, the second server device may be the server device 103 or the server device 104 shown in FIG. 1.

For description of the network management device, the first server device, and the second server device, refer to the related description part in the foregoing method embodiment. Details are not described herein again.

In this application, terms such as "first", "second", "third", and "fourth" (if exists) in the specification, the claims, and the accompanying drawings are intended to distinguish between similar objects but do not necessarily indicate a specific order or sequence. It should be understood that the data used in such a way are interchangeable in proper cases so that the embodiments described herein can be implemented in an order except the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed systems, apparatuses, and methods may be implemented in other manners. For example, the described apparatus embodiment is merely an example. For example, the unit division is merely logical service division and may be other division in an actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, service units in the embodiments of this application may be integrated into one processing unit, or each of the units may exist alone physically, or two or more units are integrated into one unit. The integrated unit may be implemented in a form of hardware, or may be implemented in a form of a software service unit.

When the service unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes a plurality of programs for instructing a computer device (which may be a personal computer, a server, or a server device) to perform all or some of the steps of the methods described in the embodiments of this application. The storage medium includes any medium that can store program code, such as a Universal Serial Bus (USB) flash drive, a removable hard disk, a read-only memory (ROM), a random-access memory (RAM), a magnetic disk, or an optical disc.

Persons skilled in the art should be aware that in the foregoing one or more examples, the services described in the present application may be implemented by using hardware, software, firmware, or any combination thereof. When the services are implemented by software, the services may be stored in a computer-readable medium or transmitted as one or more programs or code in the computer-readable medium. The computer-readable medium includes a computer storage medium and a communications medium. The communications medium includes any medium that enables a computer program to be transmitted from one place to another. The storage medium may be any available medium accessible to a general-purpose or special-purpose computer.

The objectives, technical solutions, and beneficial effects of the present application have been described in further detail in the foregoing specific implementations. It should be understood that the foregoing descriptions are merely specific implementations of the present application.

The foregoing embodiments are merely intended for describing the technical solutions of this application instead of limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

The foregoing description is merely a specific implementation of the present application, but is not intended to limit the protection scope of the present application. Any variation or replacement readily figured out by persons skilled in the art within the technical scope disclosed in the present application shall fall within the protection scope of the present application. Therefore, the protection scope of the present application shall be subject to the protection scope of the claims.

What is claimed is:

1. A device management method implemented by a first server device, wherein the device management method comprises:
   obtaining first device information of the first server device, wherein the first device information comprises an event, wherein the event comprises a plurality of events, wherein at least two types of events exist in the plurality of events, and wherein a difference between obtaining moments of the two types of events is greater than a first time threshold and is less than or equal to a second time threshold;
   determining, based on a first correspondence among the first device information, a first condition corresponding to the first device information, and a first processing action, the first condition;
   determining that the first device information meets the first condition; and
   performing, in response to the first device information meeting the first condition, the first processing action.

2. The device management method of claim 1, wherein before determining the first condition, the device management method further comprises receiving, from a network management device, the first correspondence.

3. The device management method of claim 1, wherein obtaining the first device information comprises:
   obtaining, from a database of the first server device, the first device information; or
   obtaining, from subscribed information of the first server device, the first device information.

4. The device management method of claim 1, wherein the first condition comprises a parameter threshold, and wherein determining that the first device information meets the first condition comprises determining that a parameter of the event is greater than or equal to the parameter threshold.

5. The device management method of claim 1, wherein the first device information further comprises a device identifier, wherein the first condition comprises at least one device identifier, and wherein determining that the first device information meets the first condition comprises determining that the at least one device identifier comprises the device identifier.

6. The device management method of claim 1, wherein the first processing action comprises adjusting subscribed information, configuring a target parameter, or sending a notification message to a network management device.

7. The device management method of claim 1, wherein performing the first processing action further comprises:
   obtaining a second correspondence among second device information, a second condition, and a second processing action;
   determining the second condition corresponding to the second device information;
   determining that the second device information meets the second condition; and performing, in response to the second device information meeting the second condition, the second processing action.

8. The device management method of claim 1, wherein the device management method further comprises:
determining that a parameter of the event is greater than or equal to a preset threshold; and
sending, in response to the parameter being greater than or equal to the preset threshold, the event to a network management device.

9. The device management method of claim 1, further comprising sending, by the first server device, second device information of the first server device to a network management device, wherein the second device information comprises a first device type of the first server device or a first management domain identifier corresponding to the first server device, wherein the second device information instructs the network management device to determine a first device set, wherein the first device set comprises the first server device and one or more other server devices, and wherein the first server device and the one or more other server devices have a same device type or a same management domain identifier.

10. The device management method of claim 9, further comprising sending third device information of the first server device to the network management device, wherein the third device information comprises an active/standby status of the first server device or data traffic passing through the first server device, and wherein the third device information instructs the network management device to determine a server device representative from the first device set.

11. The device management method of claim 9, further comprising:
receiving third device information of a second server device, wherein the third device information comprises an active/standby status of the second server device or data traffic passing through the second server device; and
determining, based on the third device information, that the first server device is a server device representative.

12. The device management method of claim 1, further comprising sending the first correspondence to a second server device that belongs to a same device set as the first server device, wherein the first server device is a server device representative in a first device set.

13. The device management method of claim 12, wherein a second device type of the second server device is the same as a first device type of the first server device, or wherein a second management domain identifier of the second server device is the same as a first management domain identifier corresponding to the first server device.

14. A device management apparatus, comprising:
a non-transitory memory configured to store instructions; and
a processor coupled to the non-transitory memory, wherein the instructions, when executed by the processor, cause the device management apparatus to be configured to:
obtain first device information of a first server device, wherein the first device information comprises an event, wherein the event comprises a plurality of events, wherein at least two types of events exist in the plurality of events, and wherein a difference between obtaining moments of the two types of events is greater than a first time threshold and is less than or equal to a second time threshold;
determine based on a first correspondence among the first device information, a first condition corresponding to the first device information, and a first processing action, the first condition corresponding to the first device information;
determine that the first device information meets the first condition; and
perform, in response to the first device information meeting the first condition, the first processing action corresponding to the first device information.

15. The device management apparatus of claim 14, wherein the instructions further cause the device management apparatus to be configured to receive, from a network management device, the first correspondence.

16. The device management apparatus of claim 14, wherein the instructions further cause the device management apparatus to be configured to:
obtain the first device information from a database of the first server device; or
obtain the first device information from subscribed information of the first server device.

17. The device management apparatus of claim 14, wherein the first condition comprises a parameter threshold, and wherein the instructions further cause the device management apparatus to be configured to determine that a parameter of the event is greater than or equal to the parameter threshold.

18. The device management apparatus of claim 14, wherein the first device information further comprises a device identifier, wherein the first condition comprises at least one device identifier, and wherein the instructions further cause the device management apparatus to be configured to determine that the at least one device identifier comprises the device identifier.

19. The device management apparatus of claim 14, wherein the instructions cause the device management apparatus to perform the first processing action comprises the instructions causing the device management apparatus to be further configured to:
obtain a second correspondence between second device information, a second condition, and a second processing action;
determine the second condition corresponding to the second device information;
determine that the second device information meets the second condition; and
perform, in response to the second device information meeting the second condition, the second processing action.

20. The device management apparatus of claim 14, wherein the instructions further cause the device management apparatus to be configured to:
determine that a parameter of the event is greater than or equal to a preset threshold; and
send, in response to the parameter being greater than or equal to the preset threshold, the event to a network management device.

21. The device management apparatus of claim 14, wherein the instructions further cause the device management apparatus to be configured to send second device information of the first server device to a network management device, wherein the second device information comprises a device type of the first server device or a management domain identifier corresponding to the first server device, wherein the second device information instructs the network management device to determine a first device set, wherein the first device set comprises the first server device and one or more other server devices, and wherein the first server device and the one or more other server devices have a same device type or a same management domain identifier.

22. The device management apparatus of claim 21, wherein the instructions further cause the device management apparatus to be configured to send third device information of the first server device to the network management device, wherein the third device information comprises an active/standby status of the first server device or data traffic passing through the first server device, and wherein the third device information instructs the network management device to determine a server device representative from the first device set.

23. The device management apparatus of claim 21, wherein the instructions further cause the device management apparatus to be configured to:
  receive third device information of a second server device, wherein the third device information comprises an active/standby status of the second server device or data traffic passing through the second server device; and
  determine, based on the third device information, that the first server device is a server device representative.

24. A computer program product comprising instructions stored on a non-transitory computer-readable medium that, when executed by a processor, cause an electronic device to:
  obtain first device information of a first server device, wherein the first device information comprises an event, wherein the event comprises a plurality of events, wherein at least two types of events exist in the plurality of events, and wherein a difference between obtaining moments of the two types of events is greater than a first time threshold and is less than or equal to a second time threshold;
  determine based on a first correspondence among the first device information, a first condition corresponding to the first device information, and a first processing action, the first condition corresponding to the first device information;
  determine that the first device information meets the first condition; and
  perform, in response to the first device information meeting the first condition, the first processing action corresponding to the first device information.

25. The computer program product of claim 24, wherein the processor is further configured to execute the instructions to receive, from a network management device, the first correspondence.

* * * * *